US006319482B1

(12) United States Patent
Sawell et al.

(10) Patent No.: US 6,319,482 B1
(45) Date of Patent: Nov. 20, 2001

(54) TREATMENT OF FLY ASH/APC RESIDUES INCLUDING LEAD SALT RECOVERY

(75) Inventors: Steven E. Sawell; Stephen A. Hetherington, both of Burlington (CA)

(73) Assignee: Apex Residue Recovery Inc., Burlington (CA)

( * ) Notice: Subject to any disclaimer, the term of this patent is extended or adjusted under 35 U.S.C. 154(b) by 0 days.

(21) Appl. No.: 09/180,956

(22) PCT Filed: May 16, 1997

(86) PCT No.: PCT/CA97/00336

§ 371 Date: Nov. 18, 1998

§ 102(e) Date: Nov. 18, 1998

(87) PCT Pub. No.: WO97/44500

PCT Pub. Date: Nov. 27, 1997

Related U.S. Application Data

(60) Provisional application No. 60/017,967, filed on May 20, 1996.

(51) Int. Cl.[7] .......................... C01G 21/00; C01G 21/16; G01B 13/00
(52) U.S. Cl. ................. 423/93; 423/92; 423/94; 423/95; 423/98; 423/155; 423/178; 423/197; 75/961; 106/DIG. 1
(58) Field of Search ................................. 423/92, 93, 94, 423/95, 98, 155, 178, 197, 472; 75/961; 106/DIG. 1; 23/306, 307, 302 R, 363

(56) References Cited

U.S. PATENT DOCUMENTS

| | | |
|---|---|---|
| 1,609,853 | 12/1926 | Badger . |
| 2,151,261 | 3/1939 | Bartlett .................................... 75/108 |
| 3,084,107 | 4/1963 | McMahon .............................. 202/48 |
| 3,393,149 | 7/1968 | Conley et al. .......................... 210/42 |
| 3,440,165 | 4/1969 | Davis et al. .............................. 210/4 |
| 3,800,024 | 3/1974 | Forsell et al. .......................... 423/55 |
| 3,847,713 | 11/1974 | Akune et al. ............................. 159/4 |
| 3,920,505 | 11/1975 | Helleur .................................. 159/47 |
| 3,926,129 | 12/1975 | Wall ....................................... 110/7 |
| 4,002,525 | 1/1977 | Baierl .................................... 159/47 |
| 4,130,627 | * 12/1978 | Russ et al. . |
| 4,425,228 | 1/1984 | Lynn et al. .............................. 209/17 |
| 4,503,017 | 3/1985 | Gadd et al. ............................. 423/87 |
| 4,566,975 | 1/1986 | Allgulin ................................ 210/711 |
| 4,614,543 | 9/1986 | Duyvesteyn et al. .................. 75/101 |
| 4,657,680 | 4/1987 | Zibrida ................................. 210/713 |
| 4,698,163 | 10/1987 | Zibrida ................................. 210/713 |
| 4,940,549 | 7/1990 | Olsen et al. .......................... 210/695 |
| 4,954,265 | 9/1990 | Greenberg et al. ................... 210/710 |
| 4,966,764 | 10/1990 | Reed et al. ........................... 423/499 |
| 5,009,793 | 4/1991 | Muller .................................. 210/710 |
| 5,019,360 | 5/1991 | Lehto .................................... 423/132 |
| 5,041,398 | * 8/1991 | Kauser et al. . |
| 5,102,556 | 4/1992 | Wong .................................... 210/711 |
| 5,150,985 | 9/1992 | Roesky et al. ........................ 405/128 |
| 5,262,063 | 11/1993 | Yen ....................................... 210/724 |
| 5,433,853 | 7/1995 | Mamone ............................... 210/615 |
| 5,516,974 | 5/1996 | Sasae et al. ........................... 588/256 |
| 5,961,691 | * 10/1999 | Pinard et al. . |

FOREIGN PATENT DOCUMENTS

| | | | |
|---|---|---|---|
| 0 482 335 A1 | 4/1992 | (EP) | ............................... C22B/7/02 |
| 0 684 087 A1 | 11/1995 | (EP) | ............................... B09B/3/00 |
| 2 508 490 A | 12/1982 | (FR) | ............................... C22B/7/02 |
| WO 96/23905 A | 8/1996 | (WO) | ............................. C22B/7/02 |

OTHER PUBLICATIONS

Decontamination of Municipal Waste Combustion (MWC) Fly Ash, 7th International Conference on Ash Management and Utilization held Nov. 15–16, 1994, at Arlington, Virginia. Authors: R. Painchaud, D. Couillard, G. Mercier and G. Roberge.

Environmental Assessment of Ash Disposal, Vol. 20, Issue 1, 1990. Critical reviews in Environmental Control, Thomas L. Theis and Kevin H. Gardner.

Pascale Wendling,—"Lixiviation des métaux lourds dans les résidus d'incinération de déchets municipaux, bruts er traites, soumis a l'action des pluies acides", published by Maîtrise es Sciences (Eau), Institut National de la Recherche Scientifique, University of Quebec, Canada, Décembre 9, 1994.

Claire Tincelin, —"Etude se l'enlévement des métaux lourdes contenus dans les cendres volants d'incinérateurs d'ordures ménagéres", published by Maîtrise es Sciences (Eau), Institut National de la Recherche Scientifique, University of Quebec, Canada, Jun. 1, 1994.

* cited by examiner

Primary Examiner—Steven P Griffin
Assistant Examiner—Christina Ildebrando
(74) Attorney, Agent, or Firm—Patrick J. Hofbauer

(57) ABSTRACT

The present invention relates to a process for treating fly ash/APC residues chlorides, sulphates, earth alkali metals selected from the group consisting of calcium, potassium, and sodium, and heavy metals selected from the group consisting of lead, which residues are obtained from air pollution control processes that utilize dry/semi-dry line injection, such that said residues may be disposed of as non-hazardous materials. The process comprises the sequential steps of: (a) washing and agitating the fly ash/APC residue (20) with water (50) to form a residue slurry containing solubilized lead salts and calcium chloride; (b) filtering (42) the residue slurry to remove a filtrate (46) having a pH of higher than about 11.8 and containing the solubilized lead salts and calcium chloride; and (c) recovering a first calcium enriched filter cake (44). The solubilized lead salts are then removed from the filtrate by the sub-steps of: (i) adding sufficient hydrochloric acid (58) to the filtrate to lower the pH thereof to between about 10 and 11; (ii) agitating the filtrate until a colour change from white to yellow occurs; (iii) adding additional sufficient hydrochloric acid to the filtrate so agitated to lower the pH to between about 7 and 8; (iv) filtering (82) the filtrate to remove a brine (86) containing calcium chloride; and (v) recovering a second yellow coloured, lead enriched filter cake (84).

23 Claims, 5 Drawing Sheets

TREATMENT OF FLY ASH/APC RESIDUES INCLUDING LEAD SALT RECOVERY

This application claims the benefit of U.S. Provisional Application No. 60/017,967, filed May 20, 1996.

TECHNICAL FIELD

The present invention relates to air pollution control (APC) technologies. More particularly the present invention relates to a process for treating the fly ash/air pollution control process residues obtained from air pollution control processes that utilize dry/semi-dry lime injection, such that the ash residues may be disposed of as non-hazardous materials.

BACKGROUND

During the late 1970's and early 1980's, concern over the emissions from the practice of municipal solid waste (MSW) incineration resulted in the development of more efficient incinerator operating conditions and improved air pollution control technologies. In turn, this enhanced ability to minimise emissions has resulted in the capture of greater volumes of contaminated residues in modern air pollution control (APC) systems. It is generally acknowledged that incineration typically results in a 90% reduction in the overall volume of material for disposal, and a 60 to 75% reduction in weight of municipal solid waste (MSW).

The incineration of municipal wastes is generally recognized to produce the following products: bottom ash and fly ash. Between 70 and 95% of the total ash generated by municipal waste incineration is characterized as bottom ash. Bottom ash typically contains less than 2% combustible material. Due to the extremely high temperatures at which the incineration of municipal solid wastes occur (typically about 1000° C.), there is virtually complete dissociation of organic compounds and volatilization of some metal species, leaving the bottom ash relatively heat stable and chemically inert. Typically bottom ash is relatively insoluble, with only approximately 5% of the total mass thereof being soluble in water.

The remainder of the waste incineration product is classified as fly ash. Fly ash is very soluble in water. For example, up to 30% of heat recovery system ash is soluble in water. The most common species measured in the leachates from fly ash are salts and other flue gas reaction products, specifically chloride and sulphate compounds. Chlorides alone can account for almost 40% of the weight of the soluble fraction of some fly ash. Accordingly, fly ash poses a contamination risk if it is disposed of in such a way that it may come into contact with ground water. Fly ash is considered to be a hazardous waste, necessitating "storage" in underground abandoned mines, or in specialized cells in landfill sites. Alternatively, fly ash must be treated prior to disposal if it is to be disposed of as a non-hazardous material.

Wide spread acceptance and proliferation of municipal solid waste (MSW) or energy-from-waste (EFW) facilities have been tempered by public and government concerns regarding the lack of environmentally acceptable means to dispose of classified residues from the incinerator operations. In most countries around the world, the residues generated within the air pollution control (APC) unit operations of an EFW incinerator are considered classified due to the high concentrations of readily soluble salts and potentially soluble trace metals. As a consequence of these concerns, disposal of the APC residues is one of the major issues limiting the acceptance of new EFW incinerator facilities.

To comply with increasingly stringent air emission regulations, modern air pollution control (APC) systems are designed to cool and chemically condition incinerator flue gases. The hydrogen chloride (HCl) and sulphur dioxide ($SO_2$) gases that are formed during the combustion of MSW are humidified to reduce the gas temperature to below 150° C. Cooling the incinerator off-gases promotes condensation of vaporous contaminants and enhances certain chemical reactions. This chemical conditioning is generally facilitated by the injection of powdered hydrated lime, or some other form of caustic solution, into the flue gas stream to act as an acid gas sorbent and provide reactive surfaces for condensation of volatile compounds. There are two major types of APC systems: i) wet lime injection and ii) dry or semi-dry lime injection. Acid gas neutralization reactions in dry and semi-dry lime injection APC systems result in the significant production of a predominantly calcium chloride ($CaCl_2$) and calcium sulphate ($CaSO_4$) salt waste residue stream. The $CaCl_2$ and excess lime present in the APC residues are not solubility limited and therefore are released from the solid matrix quickly upon contact with water. In fact, up to 85% of some APC ash residues are water soluble. Furthermore, since the stoichiometric ratio of the lime addition during chemical conditioning is greater than 1, the APC ash residues are highly alkaline, and the potential to solubilise amphoteric metal compounds, such as certain lead compounds, is greatly increased. Consequently, leachates from these residues may contain high concentrations of salts and trace metals including aluminum, lead, chromium and zinc.

Today, disposal of hazardous APC residues is one of the major issues limiting the acceptance and proliferation of new MSW incinerators. It has been argued that the benefits derived from landfill solid waste diversion and energy recovery from MSW incineration are negatived by the precautions which must be taken in the disposal of hazardous APC residues. The risk of leachate contamination of soil and ground water gives rise to long term environmental concerns. In response to these concerns, legislators around the world have generally responded by drafting guidelines that recommend pre-treatment of APC residues prior to disposal. Regulatory guidelines are based on the different characteristics of the two ash streams generated from municipal incinerators. Typically, incinerator design, operation and the type of air pollution control (APC) system each impact upon the residue characteristics. In particular, these factors are responsible for the partitioning of trace metals between the bottom ash and fly ash residues, and the overall solubility of the fly ash residues (see Sawell, S. E. and T. W. Constable. *The National Incinerator Testing and Evaluation Program: A Summary of the Characterization and Treatment Studies on Residues from Municipal Waste Incinerators*. Environment Canada Report, 1993). The fly ash/APC residue mixture is highly soluble (up to 65% soluble) By contrast, bottom ash is only about 5% soluble. Therefore, bottom ash is generally classified as acceptable for disposal in a sanitary landfill sites, whereas fly ash/APC residue is considered to be a classified hazardous waste due to the high concentrations of readily soluble salts and potentially soluble trace metals. There are considerable costs and significant future liability considerations associated with the generation (and storage/disposal) of classified hazardous wastes, as compared with the storage or disposal of non-classified wastes. In Canada, the Canadian Council of Ministers of the Environment (CCME) have published guidelines that specify that APC system residues should be collected and processed separately from the rest of the incinerator ash streams in order to allow for treatment prior to disposal. (see *Operating and Emission Guidelines for Municipal Solid Waste Incinerators* Report CCME-TS/WM-TRE003, June 1989.)

After disposal, solid wastes may come into contact with a leachant, such as rainwater, open surface water, or groundwater. Although attempts are made to isolate waste materials to prevent them from coming into contact with water, it is rarely possible to completely prevent contact with water. Accordingly, some of the constituents in the disposed of waste may dissolve into the leachant. Water is continually cycling between the atmosphere, surface water, and groundwater, such that the leaching of solid wastes and the subsequent transport of dissolved waste constituents can have far-reaching environmental implications. The kinds of solid wastes which are of greatest concern for leaching are incinerator, fly and other combustion ashes; sludges and cakes from physical and chemical wastewater treatment operations; contaminated soils; foundry slags; mine tailings; tank bottom sludges, etc. (These wastes are disposed of in the form of dry powders, slurries, and sludges, and may contain a wide range of organic and inorganic constituents. The constituents that are potentially hazardous to the environment are termed contaminants and their presence in potable water should not exceed drinking water quality standards. Once contaminants have been contacted by a leachant, leaching may ensue. Leaching encompasses the physical and chemical reactions that mobilize a contaminant, as well as the mechanisms of transport that carry the contaminant away from the waste. In the classification of materials as hazardous or non-hazardous for disposal purposes, the tendency of the contaminative substances to leach is the predominate consideration. For example, lead is considered to be a contaminative parameter, but if the lead is present in an insoluble compound such as lead oxide, it is highly resistant to leaching in water, and thus not of great concern if present in significant quantities in a waste material. By contrast, lead in the form of a chloride would be readily dissolved in leachates (such as groundwater) such that the presence of significant quantifies of lead chloride would render a waste material hazardous. Thus, leaching tests are conducted according to standardized testing methods to determine the hazardous nature of constituents, and classification of materials is based upon regulatory leachate limits. An example of one such regulation is British Columbia Regulation 132/92 under the *Waste Management Act*. In this Regulation, leaching test protocols are specified and regulatory leach limits are established. A sample of an ash residue to be placed in a waste disposal area is tested according to the prescribed test protocol, and if the concentrations of contaminative constituents do not exceed the specified regulatory leach limits, then the material is classified as non-hazardous and can be disposed of accordingly. Hazardous materials, so tested and classified, must either be further treated prior to disposal, or disposed of as classified hazardous wastes, and subject to specialized storage protocols.

Globally, several methods have been used in attempts to treat energy-from-waste incinerator APC residues. The most commonly attempted methods are thermal treatment or vitrification; metal recovery; and solidification or stabilisation of hazardous components. Because of the complex chemical matrix of the APC residues, these techniques have generally been costly, and most do not significantly reduce the volume of waste ultimately deposited at landfill sites.

Vitrification generally involves exposing ash to temperatures in excess of 1200° C., with the intent of incorporating the contaminants into a chemically inert matrix. However, vitrification techniques have typically been used on combined ash or bottom ash and not fly ash alone. In addition, the vitrification process is energy intensive and often requires the addition of other materials to retain contaminants in the melt. Consequently, the cost of most full-scale operations is very prohibitive. Finally, and perhaps more importantly, the contaminants of concern in the APC ash residues are volatile and tend to re-vaporize when exposed to the high temperatures of the process. Thus, the off-gas emissions from the vitrification treatment process will require further air pollution control treatment before discharge into the atmosphere, thus negating the original intent of the treatment process.

At the present time, there are some known test-scale systems which recover acids (such as HCl), salts (including NaCl), and gypsum from APC residues; however, these recovery systems are generally limited to wet residues generated from the wet lime injection air pollution control systems. These methods have not proven amenable to the treatment of dry or semi-dry APC system residues.

Ideally, given the concentrations of some metals such as lead and zinc typically present in APC ash residues, significant benefits could be realized from the recovery of metals from these residues. Unfortunately, at the present time, the complex chemistry of the APC residues makes it very difficult to isolate and accumulate many of the trace metals present in the residues in forms pure enough for reprocessing and recycling. One exception is the recovery of mercury. A process commonly known in the art as the German "3R" process is capable of recovering mercury from APC residues; however, this process is limited, in that it can only be used on the residues from wet scrubber system applications. There are currently no known commercial metal recovery systems in operation for the treatment of dry and semi-dry APC ash residues.

Solidification generally implies a process which mixes the APC residues with pozzolanic (cement-like) materials to reduce the leaching of contaminants by reducing the surface area available for contact with water (physical encapsulation). The term solidification also infers the maintenance of a highly buffered environment which limits trace metal solubility (chemical stabilisation). It is a relatively cost-effective process; however, researchers have observed that solidification techniques are not wholly effective. (see Hartlën, J, and A. M. Fällman. "New Perspectives on the Management of Residues from MSW Incineration in Sweden" *Proceedings of the 7$^{th}$ International Recvcling Congress, Waste Management International*, Ed K. J. Thome-Kozmiensky, Pub. EF-VERLAG fur Energie-und Umwelttechnik GmbH, Berlin, Germany, 1992.) Since a substantial proportion of APC residues consist of soluble chloride salts, major problems have been encountered with the loss of structural integrity and durability of the solid matrices due to salt leaching. Moreover, the highly alkaline nature of the matrix can lead to the leaching of amphoteric metal compounds, such as lead (Pb) and zinc (Zn) compounds. One known and commercially available stabilization process requires the addition of large volumes of phosphoric acid to the APC residue to convert soluble lead (Pb) to insoluble lead phosphate compounds. Although this process is reasonably effective at reducing lead solubility, the process does not prevent salt leaching. Moreover, this process adds approximately 40% (acid+water) weight to the remaining treated residues, and this increase in volume brings a concurrent increase in the demand for landfill storage space, and associated costs.

OBJECTS

It is an object of the present invention to provide a method for the conversion of fly ash and hazardous APC residues into materials that meet globally recognized non-hazardous waste criteria.

More particularly, it is an object of the present invention to provide a method of treating fly ash/APC residues from air pollution control devices so as to reduce hazardous waste disposal volumes, costs, and liability concerns.

It is a further object of the present invention to provide a method of treating fly ash/APC residues so as to provide for the recovery of several by-product streams, including commercial grade $CaCl_2$ liquor; lead in a form suitable for recycling; and a calcium & silicate enriched non-hazardous residue which can be marketed as an adjunct to concrete, ceramic brick or asphalt products, or disposed of as a non-hazardous waste material.

It is yet a further object to provide a method which may be integrated with municipal waste incineration facilities to utilize steam generated during waste incineration.

It is still a further object to provide a method of treating fly ash/APC residues which will improve the overall incineration facility energy utilization and efficiency.

It is still a further object to provide a cost effective method of treating fly ash/APC residues which has competitive operating costs relative to known/competitive APC residue treatment alternatives, and which includes potential revenue generation from the sale of recovered by-products that have identified commercial markets.

SUMMARY OF THE INVENTION

A method is provided from the treatment of fly ash/APC residues containing chlorides, sulphates, earth alkali metals selected from the group consisting of calcium, potassium, and sodium, and heavy metals selected from the group consisting of lead. The method is characterized by the sequential steps of: (a) washing and agitating the fly ash/APC residue with water to form a slurry containing solubilised lead salts and calcium chloride; (b) filtering the residue slurry to remove a filtrate having a pH of higher than about 11.8 and containing the solubilized lead salts and calcium chloride; and, (c) recovering a first calcium enriched filter cake. The filtrate is then further treated so as to remove lead salts (d) therefrom by the sequential sub-steps of: (i) adding sufficient hydrochloric acid to the filtrate to lower the pH thereof to between about 10 and 11; (ii) agitating the filtrate until a colour change from clear to white to yellow occurs; (iii) adding additional sufficient hydrochloric acid to the filtrate so agitated to lower the pH to between about 7 and 8. The filtrate is then filtered (iv) to remove a brine containing calcium chloride; and (v) a second yellow coloured lead enriched filter cake is recovered. Finally, the brine is concentrated and purified to generate calcium chloride liquor having a selected concentration and purity.

DETAILED DESCRIPTION OF THE BEST MODE

The ash residues to be treated according to the method of the present invention include both fly ash/APC residues generated during incineration of municipal waste and the fly ash/APC residue which may be generated by dry or semi-dry lime injection air pollution control (APC) processes. The ash residues typically contain alumina, silicates, calcium chloride, and trace metal salts, in particular lead salts. No further distinction is made between fly ash residues and APC residues for the purposes of the present description and the claims which follow.

Figure 1:
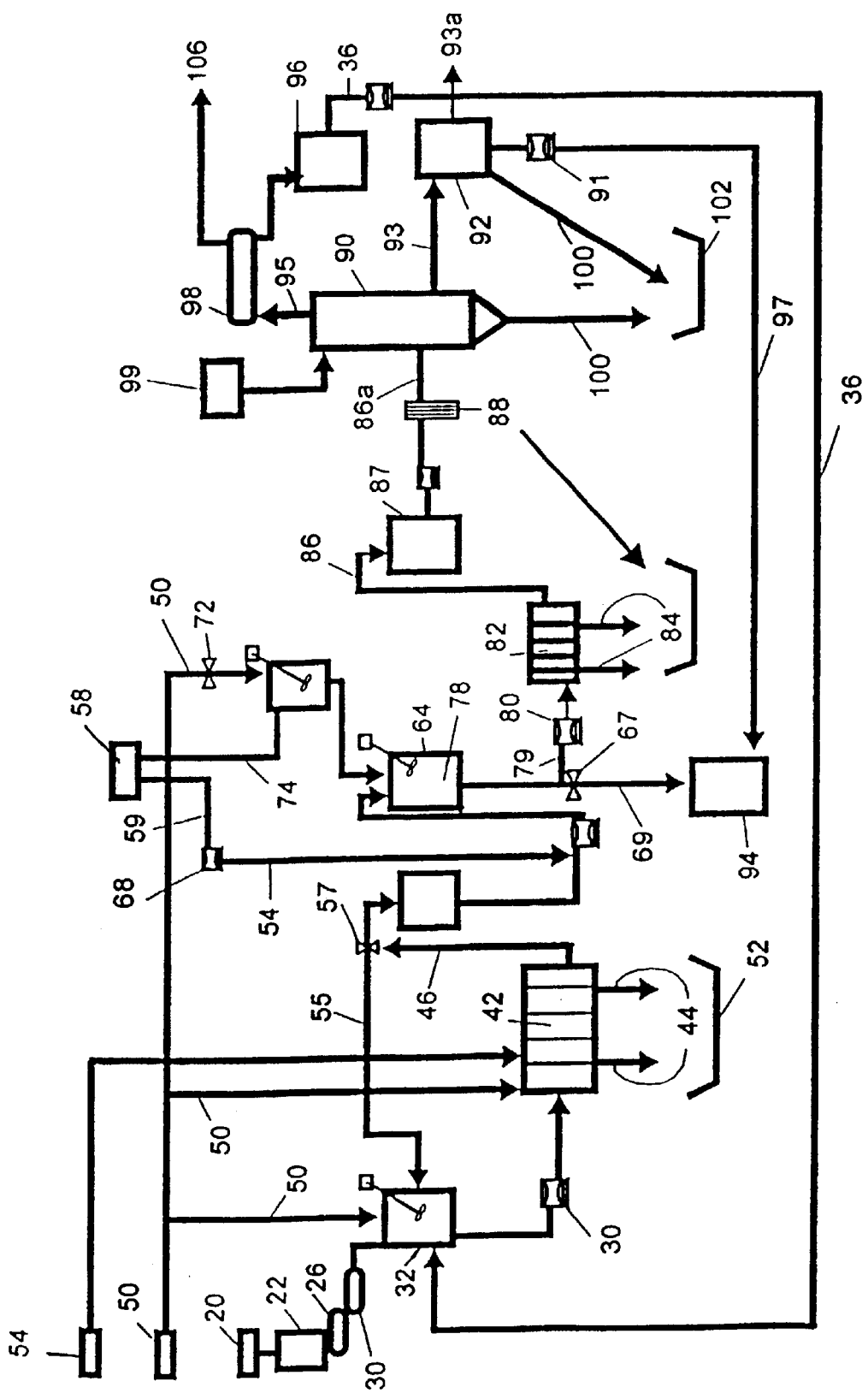
FIG. 1 is a schematic flow diagram providing an overview of a method of treating fly ash/APC residues according to the present invention, incorporating the three stages of: (1) ash washing and dewatering; (2) metal precipitation; and, (3) purification and concentration of calcium chloride brine by evaporation.

Referring now to FIG. 1 of the drawings, the method for treating fly ash/APC residues of the present invention is summarized schematically. Generally speaking, the method may be divided into the following three major unit operations:

(1) a first stage involving fly ash/APC residue washing followed by solid/liquid phase separation to obtain a first calcium enriched filter, and a filtrate;

(2) a second stage involving processing of the filtrate for metal recovery, in particular lead recovery, via precipitation which is facilitated by a two stage pH adjustment;

(3) a third stage involving evaporative concentration of remaining brine to recover a concentrated and purified calcium chloride brine

(1) FLY ASH/APC RESIDUE WASHING-SOLID/LIQUID PHASE SEPARATION

Figure 2:
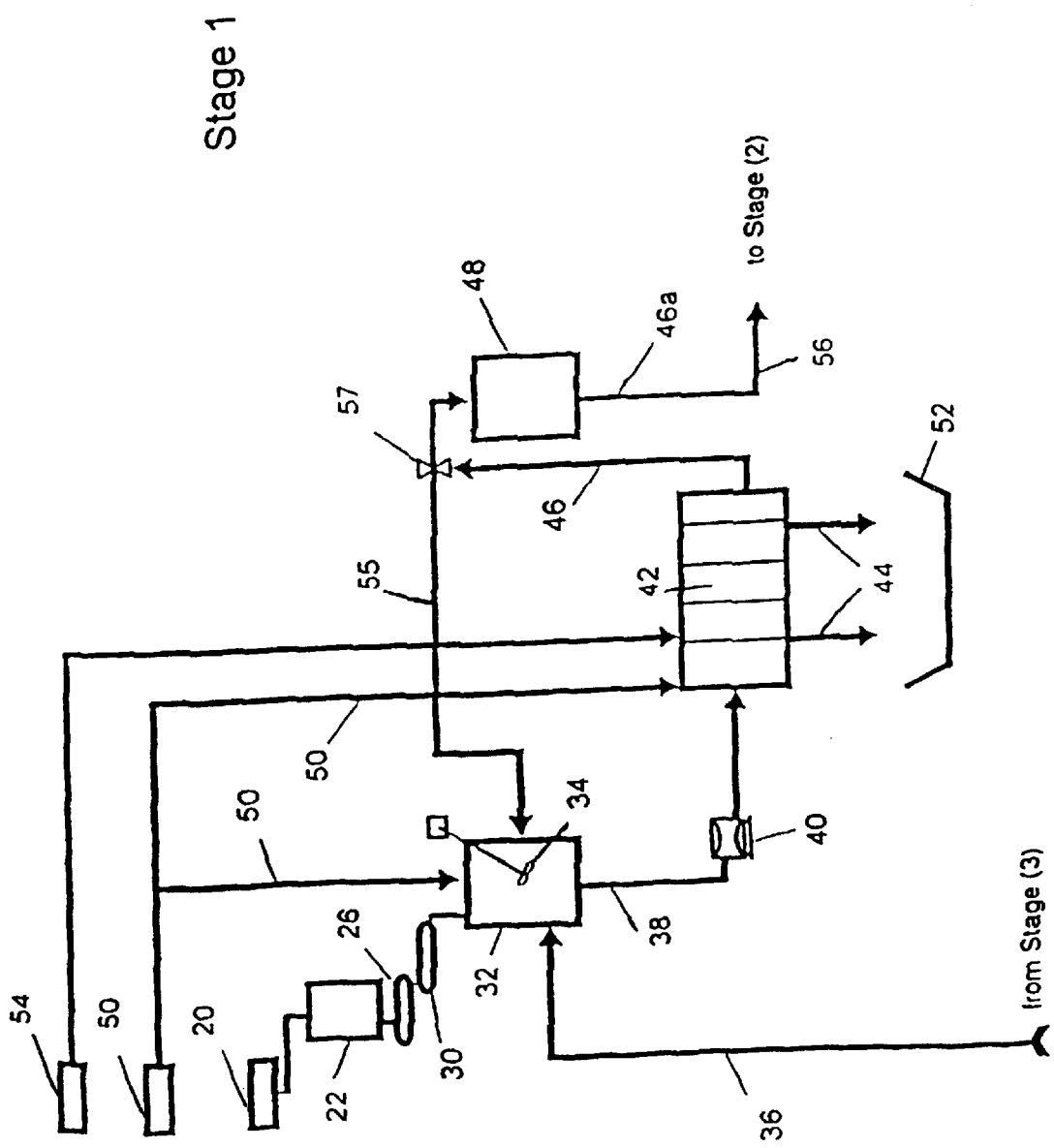
FIG. 2 is a schematic flow diagram enlarged to provide further detail of the ash washing and dewatering stage (1)

Referring now to the first process stage shown on an enlarged scale in FIG. 2, most incinerators have existing air pollution control residue truck loading systems, which can be adapted for use as the basis for introducing fly ash/APC residues into the process line of the present invention. Typically the fly ash/APC residue 20 is dumped into and is stored in an ash silo 22 until the ash 20 is required for processing. The residue 20 is then discharged from the ash silo 22 through a feeder 26. A weigh feeder 30 is installed downstream of the feeder 26 to measure the specified batch quantity of residue 20 to be introduced to the treatment system. The ash residue 20 will be physically conveyed to a batch mix tank 32 by the weigh feeder 30.

The batch mix tank 32 is represented schematically as a chamber or tank including an agitator system operating with a powered propellor 34. A variety of such arrangements are known in the art, and may be used in a system according to the present invention. In other places in the process of the present invention where an agitation tank or mixing chamber are represented in the Figures, similar symbols are used. It will be well understood by those skilled in the art that at each point where an agitation system is desired, a variety of arrangements may be used, including ones that do not rely on a paddle or propellor for agitation.

The first washing stage of the present invention requires the introduction of process water 36 to the fly ash/APC residue 20 so as to wash the ash residue 20. Preferably, the process water 36 and ash residue 20 are mixed in a liquid-to-solid (L/S) ratio of between about 2.5:1 and 6:1 in the batch mix tank 32, which is appropriately sized. The quantity of process water 36 introduced into the batch mix tank 32 will be controlled by level switches or flow meters (not shown) to ensure the correct liquid/solid ratio for mixing. The process water 36 can be sourced as a combination of the incinerator facility potable water supply 50 and from the return condensate 36 from the evaporation which occurs during the purification and concentration of calcium chloride brine, which evaporation will be discussed in greater detail below. The process water 36 for mixing with the fly ash/APC residue 20 does not require any pre-treatment or pumping equipment.

In the batch mix tank 32, the ash residues 20 and process water 36 will be agitated using the mixing agitator 34. Agitation will continue for sufficient time to thoroughly mix the process water 36 and the residue 20 to form a residue slurry 38. The preferred duration for agitation is approximately 2 to 10 minutes. The exact chemical content of the residue slurry 38 will vary with the chemical content of the original residue 20, and can contain trace amounts of many different substances, influenced largely by the nature of the materials originally incinerated, and the particular air pollution control methods by which the residue 20 was generated. Generally speaking, metals including amphoteric lead and zinc compounds, and highly soluble salts comprising mainly calcium chloride, sodium chloride and potassium chloride are solubilized in the liquid component of the residue slurry 38. Minor amounts of other substances are also present in the liquid component, but calcium chloride and sodium chloride constitute the bulk of the dissolved material, with calcium chloride being present in much higher concentrations than sodium chloride.

Following agitation in the batch mix tank 32, the residue slurry 38 is then pumped from the batch mix tank 32 for further processing. In FIG. 2 the symbol at reference number 40 is used to generally represent a pump. A variety of conventional pump systems may be used, and it would be obvious to those skilled in the art to select a suitable known pumping system for the residue slurry 38. Similar symbols are used throughout the Figures to represent pumping systems, and in each instance the selection of a particular pumping system having operable pumping characteristics will be obvious to one skilled in the art.

The next sequential step in the process of the present invention is the filtering of the residue slurry 38 to remove a filtrate therefrom. The residue slurry 38 is maintained at ambient temperatures. Since the residue slurry 38 is highly alkaline filter press equipment specified to handle alkaline conditions will be required. Accordingly, it is possible to accomplish liquid/solid phase separation of residue slurry 38 using simple filtration equipment, rather than by using a series of processing thickeners (which would require a significant input of energy). In the preferred embodiment shown, the residue slurry 38 is fed from the batch mix tank 32 to a caulked, gasketed, recessed filter plate press 42 to facilitate the liquid/solid phase separation. This filter press operation will take approximately 0.5 hours, and this filtration step represents the rate limiting step for the entire residue treatment system of the present invention. A first filter cake 44 of solid materials is produced as an output from the filter press 42. The first filter cake 44 is enriched in calcium, and typically contains other species including sulphates, carbonates, alumina, and silicates. A filtrate 46 is retained and directed to a filtrate hold tank 48 for further processing, as will be discussed below. In order to further reduce the chloride and soluble lead content of the first filter cake 44, the first filter cake 44 is preferably rinsed with potable from the water supply 50. The volume of water used for rinsing will vary with the nature of the chemical make up of the original fly ash/APC residue being treated. Preferably, rinsing is continued until the chloride concentration in the first filter cake 44 is within a desired range. It is preferred that the chloride content in the first filter cake should be less than about 5000 ppm. This concentration can be indirectly determined by installing a conductivity probe in line in the filtrate 46 stream. The conductivity probe will detect changes in the conductivity of the filtrate 46, reflecting variations in the chloride concentration of the filtrate 46 as the chlorides are washed out of the first calcium enriched filter cake 44. The flow of water steam 50 is triggered to rinse the first filter cake 44 by way of a conventional process flow control scheme. Following rinsing of the first filter cake 44, the rinse water will contain significant quantities of chlorides and soluble lead compounds. This used rinse water 55 will be flushed through the filter press together with the filtrate 46. A valve 57 can optionally be activated to direct the flow of the rinse water 55 to be recycled back to the batch mix tank 32 to initially wash further batches of the fly ash/APC residue 20.

It is preferred to install the filter press 42 in an elevated position in order to accommodate a suitably sized disposal bin 52 underneath the filter press 42. The rinsed first filter cake 44 will then be air blown from an air source 54 to reduce the moisture content thereof to approximately 35 to 45% by weight. After the air blow, the first filter cake 44 is released from the filter press 42. Thus, the filter cake 44 will then be of a suitable quality to be marketed as a non-classified concrete aggregate material, or to be disposed of as a non-hazardous waste in a conventional sanitary landfill.

Table 1 provides an analysis of the first filter cake 44 enriched in calcium, silicates, and alumina produced according to the process described hereinabove. Two samples of were taken from a first filter cake 44 and analysed for the prsence of various alkali metals, heavy metals, and other non-metal parameters. The results obtained clearly indicate that significant quantities of calcium are recovered in the filter cake 44, while the lead concentrations have decreased significantly to approximately 2300–2500 mg/kg, from original ash concentrations of approximately 6000 mg/kg.

So long as the filter cake 44 is deemed non-classified or non-hazardous, it can be disposed of in a conventional landfill site, or can be used a general construction aggregate (such as an adjunct to concrete, ceramic, brick, or asphalt products). The particular composition of the filter cake is less important to its use as a general construction aggregate than the absence of significant heavy metal or chloride contamination. Standard leaching tests, such as that specified under B.C. Reg 132/92 identified hereinabove, have been conducted on samples taken from the first filter cake 44 and have been found to contain lead values in the leachate of less than 5 ppm, which level is dictated in the Regulation as the maximum allowable level for designation as a non-hazardous waste. The results of the leach tests are summarized in the Table 1. Further details on the sampling and leachate testing and analysis are provided hereinbelow.

TABLE 1

| STREAM | Cl | SO4 | Ca | K | Na | Al | As | Cd | Cr | Cu | Mg | Pb | Se | Zn | Hg |
|---|---|---|---|---|---|---|---|---|---|---|---|---|---|---|---|
| Concentrations (ppm) of Selected Elements in Various Streams | | | | | | | | | | | | | | | |
| Raw APC Ash (solid) 20 | 171429 | 39257 | 214345 | 28214 | 21527 | 11291 | 184 | 356 | 218 | 749 | 5169 | 5590 | 1.56 | 22522 | 40.1 |
| First Filter Cake 44 (solid) | 3930 | 31750 | 239500 | 9475 | 9425 | 50000 | 142.5 | 240 | 330 | 835 | 13500 | 2400 | 1.415 | 17500 | 58.3 |
| Filtrate 46 | 50450 | 956.5 | 15875 | 5215 | 5215 | 0.54 | 0.0159 | 0.18 | 0.0625 | 1.585 | 0.305 | 896 | 0.02773 | 136 | |
| Second Filter Cake 84 (solid) | 51000 | 10000 | 29000 | 4880 | 4400 | 1083.5 | 2.615 | 0 | 400 | 930 | 58.1 | 660000 | 4.605 | 23900 | 11.2 |
| Brine 86 | 48775 | 735.5 | 22250 | 8637.5 | 7120 | 0.0425 | 0.00186 | 0.055 | 0 | 0.515 | 0.1825 | 60.7 | 0.00451 | 69.875 | |
| CaCl$_2$ Liquor 93 | 255000 | | 145000 | 26500 | 11100 | | | | | | | 1.2 | | | |
| LEACH TESTING | | | | | | | | | | | | | | | |
| Regulatory Limits SWEP | | | | | | | 5.0 ppm | 0.5 ppm | 5.0 ppm | 500.0 ppm | | 5.0 ppm | 1.0 ppm | 500.0 ppm | 0.1 ppm |
| First Filter Cake 44 | | | | | | | 0.005 | <0.02 | 0.19 | 0.07 | | 3.48 | 0.0296 | 3.20 | .013 |

The filtrate 46 recovered from the filter press 42 is transferred to the filtrate holding tank 48. Alternatively, if some residual solids remain in the filtrate 46, it can be redirected by valve 57 and recycled back to batch mix tank 32 for reprocessing with further ash 22. The filtrate holding tank 48 may advantageously be equipped with a high level interlock (not shown) with the filter press 42 discharge to prevent the possibility of the filtrate holding tank 48 being overfilled.

(2) PROCESSING OF THE FILTRATE FOR METAL RECOVERY

Figure 3:
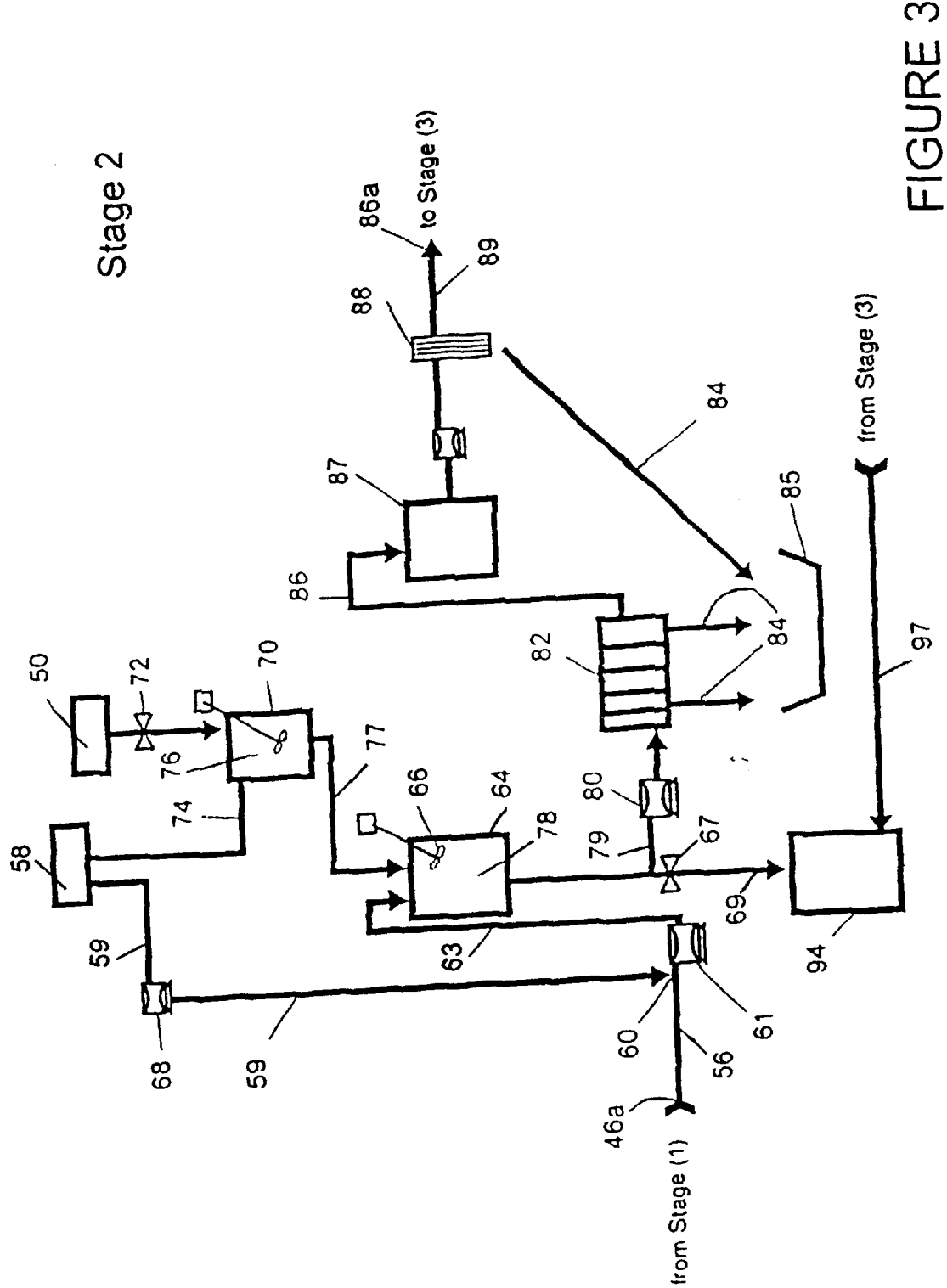
FIG. 3 is a schematic flow diagram enlarged to provide further detail of the metal precipitation stage (2)

The second stage of the process of the present invention will now be discussed with primary reference to FIG. 3. During the ash washing process of stage 1, certain trace metals such as zinc and lead are solubilised and remain in solution in the filtrate 46a after the liquid/solid phase separation. Since these trace metals are undesirable contaminants in any wastewater discharge stream or in the feed to the third stage of the process of the present invention, it is necessary to remove these metals from the filtrate 46a. A common method for removal of inorganic metals from solution is chemical precipitation via pH adjustment. The solubility of an individual species in a mixture is very complex. The rate and order of precipitation of various species will depend upon numerous variables including: the relative solubility constants and the concentrations of the various species in the mixture, the temperature and the pressure at which the mixture is maintained etc. In accordance with the present invention, a unique set of time and pH conditions has been determined as being necessary to preferentially precipitate lead compounds from the filtrate 46a.

Since the filtrate 46a, was originally obtained by adding water to ash residue 20 generated from air pollution control methods involving the addition of large quantities of lime, the filtrate 46a will be highly alkaline, typically having a pH of 12 or higher. The filtrate 46a recovered from the filter press 42 is typically clear and colourless in appearance. In order to obtain metal removal by chemical precipitation according to the present invention, initially, hydrochloric acid (HCl) is added to the filtrate 46a so as to cause the pH to drop from about 11.8 or higher to between about 10.0 and 11.0. This is accomplished as follows. The filtrate 46a is pumped from the filtrate holding tank 48 along a process line 56. Concentrated HCl from a source 58 is introduced into process line 56 at 60 preferably using an injection quill (not shown). The hydrochloric acid used at this stage is highly concentrated, approximately 10–12N (normal). After the filtrate stream 46a has been injected at 60 with concentrated HCl acid 58, the combined stream will preferably be immediately fed to a mixing centrifugal pump 61 to maximize mixing and corresponding precipitation of metal compounds. This combined stream 63 is pumped to a slow mix tank 64 equipped with an agitator 66 to facilitate further metal precipitation. The agitator 66 in the slow mix tank 64 is preferably control interlocked with a tank low level shut off (not shown) in order to ensure that the agitator blades of the agitator 66 do not run dry. The slow mix tank 64 is additionally control interlocked with the mixing centrifugal pump 61 to prevent the possibility of the mixing centrifugal pump transferring a batch of filtrate 46a before there is sufficient capacity in the slow mix tank 64 to accept the filtrate 46a.

The combined stream 63 containing filtrate 46a with the added concentrated HCl from source 58 is agitated in the slow mix tank 64. The necessary duration of the mixing time can be determined by the observation of the colour of the mixture in the slow mix tank 64. A noticeable colour change from the original clear filtrate 46 to white to yellow colour will occur. Typically the elapsed time for the completion of these colour changes is between about 5 and 10 minutes.

Concentrated HCl from source 58 is also preferably used to make-up the dilute HCl required for fine pH adjustment of the stream 63. It is necessary to keep a constant supply of concentrated HCl available for this purpose. This may be accomplished using any conventional storage protocol for a strong acid of this type. One such protocol includes obtaining HCl in 240 kilogram (approximately 200 liters) barrel drums (not shown). With this protocol, a supply of concentrated HCl can be stored using an acid barrel rack (not shown) as the source 58. A metered acid pump 68 is preferably used to pump pre-determined volumes of the hydrochloric acid from the source 58 through an acid line 59 to the injection quill at in the process line 56 at the injection point 60. The centrifugal mix pump 61 and the metered acid pump 68 are advantageously be control interlocked so that the acid pump 68 cannot start without the mixing centrifugal pump 61 running. The control interlock of these pumps 68, 61 will prevent the possibility of HCl accumulating in the piping of the process line 56. It is preferable to construct the acid line 59 from either chemical resistant chlorinated polyvinyl chloride (CPVC) or fibreglass reinforced plastic (FRP) materials.

Additional concentrated HCl acid from source 58 is periodically diverted through a metered concentrated acid line 74 and into a separate dilute acid tank 70. The dilute acid tank 70 is equipped with a metered water inlet 72 for potable water from source 50. The dilute acid tank is preferably constructed of fibreglass reinforced plastic (FRP) with a corrosion resistant liner. The dilute acid tank 70 is preferably equipped with a scrubber (not shown) to capture acid vent gases, and a slow speed agitator to ensure that the dilute HCl is mixed to the correct proportions. The agitator will be interlocked with a low level shut-off (not shown) to prevent the agitator blades from running dry. Dilution of the concentrated HCl is conducted in the dilute acid tank 70 to generate a supply of dilute HCl acid solution 76.

The dilute HCl acid solution 76 is pumped from the dilute acid tank 70 through a dilute acid line 77, into the slow mix tank 64, and slow agitation is continued for approximately 10 minutes or less. The dilute hydrochloric acid 76 so added has a preferred concentration of approximately 2N. The addition of the 2N hydrochloric acid 76 causes the pH of the mixture in the slow mix tank 64 to drop to an endpoint of between about 7.0 and 8.0.

This method of time delayed two step pH adjustment specifically precipitates a yellow metal precipitate 78 which is believed to be predominantly lead oxychloride, which yellow precipitate 78 does not otherwise precipitate under a typical continuous pH adjustment approach. Given the complex chemical make-up of APC residues, there remains some possibility that other species are in fact present and responsible for the yellow colouration obtained. Tests to date by the applicant have been inconclusive in this regard. Reference should be had to the further characterizing detail of the yellow precipitate provided hereinbelow.

The reaction mixture containing the yellow metal precipitate 78 is preferably fed through process line 79 by pump 80 to a recessed plate filter press 82 for continuous solids removal. A second lead enriched filter cake 84 is recovered from the filter press 82. The second filter cake 84 represents greater than about 50% of the original lead content of the fly ash/APC residue 20. The second filter cake 84 is a by-product of the method of the present invention, and it has been found to be a chemically acceptable feedstock for use in lead smelting. The second filter cake 84 is ma ally removed from the filter press 82 on an as needed basis. A suitably sized disposal bin 85 will be used to store the second lead enriched filter cake 84 from the filter press 82 until sufficient quantities of the second filter cake 84 material accumulate for periodic removal and transport to an off-site lead smelter or repository. The following Table 2 summarizes an analysis conducted on the second lead enriched filter cake 84 generated by the method of the present invention.

TABLE 2

METAL PRECIPITATE ANALYSIS

| Element | Concentration |
| --- | --- |
| Pb | 66–75% |
| Zn | 2.4–5.2% |
| Ca | 1.4–2.9% |
| Na | 0.25–0.45% |
| K | 0.30–0.50% |
| $SO_4$ | 1.0–1.5% |
| Cl | 3.0–5.0% |

Note:
In wt %, unless otherwise stated. The metal precipitate cake may contain <5% (w/w) cellulose filtration aid material.

During the filtering of the yellow metal precipitate 78 mixture to form the second filter cake 84, a brine 86 from the filter press 82 is allowed to flow to a reservoir tank 87. The pump 80, which conveys the mixture containing the yellow precipitate 78 to the filter press 82, is preferably control interlocked with a high level shut off sensor in the reservoir tank 87 to prevent overfilling of the reservoir tank 87. The brine 86 may be recirculated through the filter press 82 (by a recirculation line, not shown) in order to remove any residual yellow metal precipitate 78 which was not removed by the initial filter pressing operation. Additionally, further filtration of the brine 86 is preferably conducted at a secondary filter 88 downstream of the reservoir tank 87. The filtration device may consist of either a fine particle filter (typically of <1 micron pore size) or an activated carbon filtration device. Any lead enriched second filter cake material 84 recovered during secondary filtration is transferred to the storage bin 85 for subsequent removal, as discussed above.

(3) EVAPORATIVE CONCENTRATION OF REMAINING BRINE

After metal precipitation of stage 2, the brine solution 86*a* which is recovered consists predominantly of calcium chloride ($CaCl_2$), sodium chloride (NaCl) and potassium chloride (KCl) salts. Calcium chloride is the predominant salt in the brine 86*a*, and it has commercial value in concentrated form.

Figure 4:
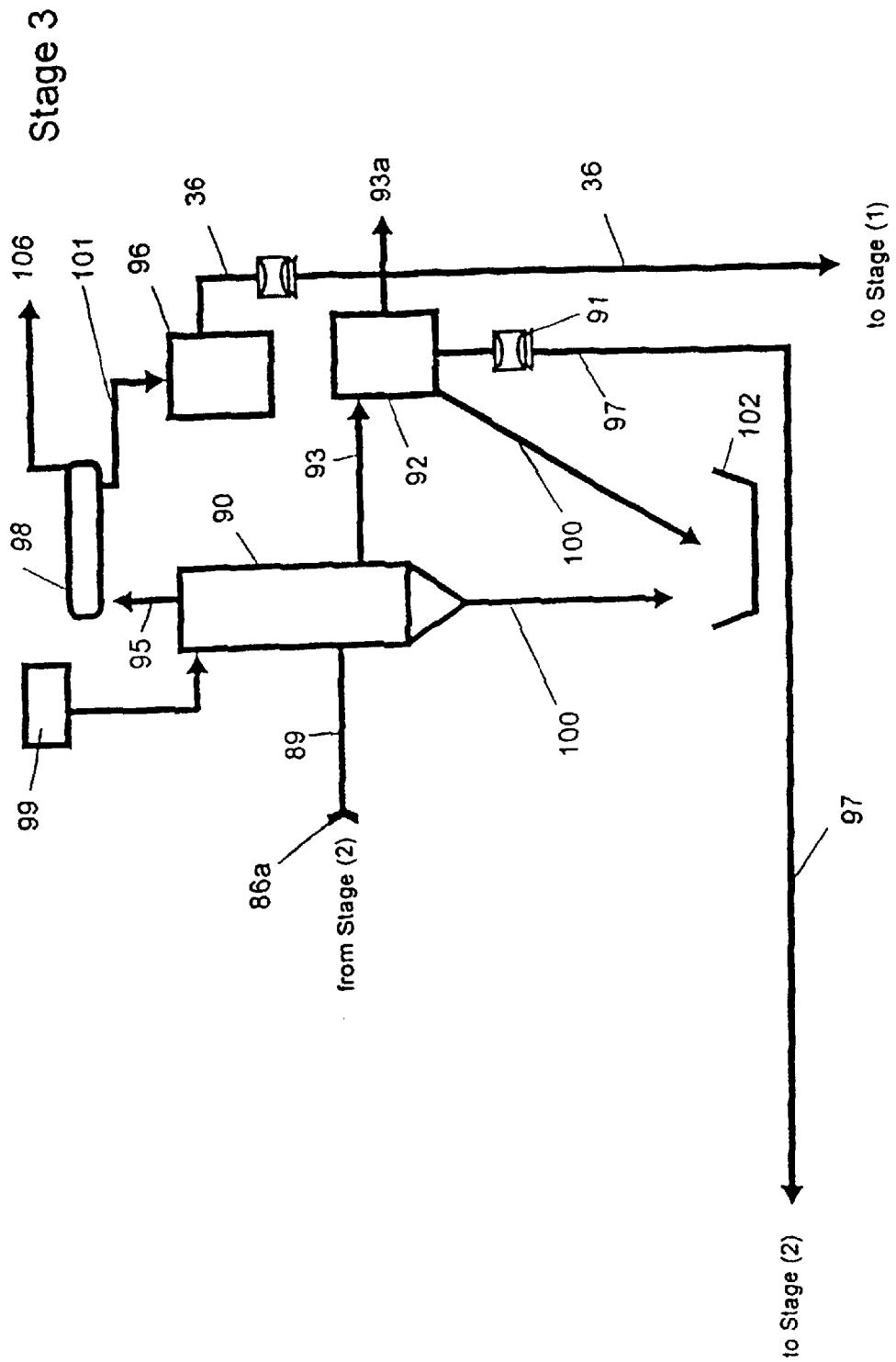
FIG. 4 is a schematic flow diagram enlarged to provide further detail of the purification and concentration stage (3)

Reference will now be made to FIG. 4 of the drawings, wherein the third stage of the process of the present invention is described. As indicated above, in order to further concentrate the calcium chloride content in the brine 86*a*, the brine 86*a* from the metal precipitation steps will be transferred through process line 89 and fed into an evaporator 90. In the evaporator 90, the brine 86*a* will be heated to cause evaporation of water vapour 95 therefrom.

Significant data already exists for the relative precipitation of calcium, sodium, magnesium and potassium as chlorides from typical brine solutions over a range of temperatures. The solubilities of both KCl and NaCl are lower than that of calcium chloride ($CaCl_2$), and consequently KCl and NaCl will begin to preferentially precipitate out of solution as crystalline solids at higher temperatures in the evaporator 90. Evaporation is a well-established process in the production of potable water (distillate) from brackish and marine waters, and is, more importantly, well known as a method used to produce commercial grade calcium chloride liquor. The evaporation stage of the method of the present invention produces a marketable brine solution by-product that preferably meets the following $CaCl_2$ specifications: (i) a minimum of 30% $CaCl_2$ solution; (ii) less than 8% alkali-metal contamination measured as NaCl; and, (iii) less than 100 ppm of other contaminants. These specifications are standard for marketable calcium chloride brine solutions. Typical $CaCl_2$ commercial sales specifications, as compared with the $CaCl_2$ brine obtained by the method of the present invention, are provided in the following Table 3:

TABLE 3

Calcium Chloride Brine Characterization

| Test Parameters | Typical Specifications for Marketable $CaCl_2$ Brines | Analysis of Concentrated $CaCl_2$ according to the present invention |
|---|---|---|
| $CaCl_2$ - by weight | 30–42% | 31.9% |
| Colour | Water white to greyish white | Clear |
| Total Alkali Chloride (as NaCl) | 3–4% (8% max) | <8% |
| Pb | <10 ppm | <5 ppm |

A concentrated $CaCl_2$ brine solution 93 is thus generated in the evaporator, and is preferably transferred through a process line from the evaporator 90 to an insulated conical bottomed brine storage tank 92. The bottom of this brine storage tank 92 is preferably steam line traced in order to facilitate periodic cleaning thereof. The brine storage tank 92 is preferably of a suitable size to store a typical commercial truck shipment volume (typically 35000 liters) of concentrated calcium chloride brine 93. The brine storage tank 92 may advantageously be equipped with any necessary truck or rail car loading and pumping equipment. The brine storage tank 92 will be valved so that the concentrated brine 93, if it does not meet the desired concentration specifications outlined above, can be manually diverted through process line 97 with the aid of pump 91, to an off-spec tank 94. The off-spec tank 94 preferably has the necessary process piping (not shown) to bleed off-spec material back into the batch mix tank 32, to be used as process water for the washing of further batches of ash residue 20. Thus, if any concentrated brine 93 does not reach the desired $CaCl_2$ concentration, it can be recycled again through the process of the present invention.

It is estimated that approximately 3000 kg per hour of steam from a steam source 99 is required to concentrate by evaporation approximately 2000 L/hr of the brine solution 86a. Almost all conventional municipal energy-from-waste incinerator facilities generate steam which can advantageously be used as the source of steam 99 for the evaporator 90. The utilization of some of the incinerator facility steam to power the evaporator 90, in this manner, will actually increase the overall energy efficiency of conventional incinerator operations.

It is also preferred that the water vapour 95 from the evaporator 90 be used in conjunction with a condenser 98 as a heat source 106 to preheat boiler feed water for a municipal waste incinerator (not shown) operating in conjunction with the process of the present invention. The preheating of boiler feed water will increase the efficiency of the incinerator steam generation cycle. Similarly, the water vapour 95 can be used with the condenser 98 as a heat source 106 to preheat the evaporator feed brine 86a and thus increase the efficiency of the evaporator 90, and decrease the steam requirements. It is also preferred to lower the temperature of the vapour 95 and to transfer the condensed vapour 101 from the condenser 98 to storage tank 96 for incorporation into the process water 36, for recirculation and reuse to wash further batches of ash residue 20 in the batch mix tank 32. It is also preferred to cool condensed vapour 101 to approaching ambient temperature to minimize caustic embrittlement problems when mixing the process water 36 with the alkaline fly ash/APC residue 20. By recycling the condensed vapour 95, the fresh process water 50 requirements for the washing of the ash residues 20 in stage 1 of the process of the present invention will be reduced.

As stated above, KCl and NaCl preferentially precipitate out of solution as crystalline solids 100 in the evaporator 90. These crystalline solids 100 are removed by periodically blowing down the evaporator 90. A blow down stream (not shown) will be directed to a vibratory screen (not shown) to remove the crystalline solids 100, which solids 100 are then dumped into a bin 102 for periodic disposal or use as road salt. Similarly, residual KCl and NaCl crystals which may periodically collect in brine storage tank 92 may also be removed and dumped into the disposal bin 102 for disposal.

An analysis of the various process streams of the method of the present invention has been conducted in order to track the presence of various parameters, including heavy metals, (in particular, lead) as well as, calcium and chloride ions. The results of these analyses are summarized in Table 1. As this table indicates, the raw APC ash residues 20 have significant concentrations of lead and calcium chloride. The washed residue (ie. the first filter cake 44) has a significantly lowered lead concentration. The metal precipitate, (ie. the second yellow lead enriched filter cake 84) has a lead concentration of about 660,000 ppm, reflecting the recovery of most of the trace lead from the filtrate 46 by the two stage pH adjustment. After removal of the yellow precipitated metal solid in the second lead enriched filter cake 84, the remaining filtrate 86 contains a low lead concentration, and significant concentrations of calcium chloride. The calcium chloride concentration is increased further in the $CaCl_2$ brine 93 generated as a result of the evaporation stage.

In order for waste materials, such as municipal waste incinerator fly ash to be disposed of as a non-hazardous material, the levels of certain trace metals present must be below certain acceptable value limits. For example, as discussed above, for non-hazardous classification in British Columbia, the lead levels present in a leachate must be below 5 parts per million. The method of the present invention was employed to generate the first calcium enriched filter cake 44. This filter cake 44 was subjected to leachate testing in accordance with the testing protocols prescribed under the Special Waste Extraction Procedures (SWEP), British Columbia Regulation 132/92 under the Waste Management Act. The results of the leachate testing and the concentration testing in the various process streams (discussed above) are summarized in Table 1. Leachate lead testing on the first filter cake 44 yielded leachate lead concentrations which were within the 5 ppm limit established in the Regulation. Similarly leachate levels of other parameters, such as arsenic, cadmium, zinc, etc., were also within acceptable value limits. Thus, the first filter cake 44 enriched in calcium, alumina and silicates will classify as a non-hazardous material under the above-identified Regulation.

It is believed that the particular lead compound preferentially precipitated by the two step pH adjustment of stage 2 of the method of the present invention is lead oxychloride. Table 4 (which follows) summarizes a comparison of the precipitation products which occur during a single stage pH adjustment of the filtrate 46a, and the two stage method described hereinabove. An analysis was carried out using identical quantities of raw ash, washed and filtered to remove a first filter cake. Equal quantities of the filtrate therefrom were treated with equal amounts of concentrated hydrochloric acid. The standard single step pH adjustment control test generated a white precipitate. The precipitate was analysed and found to contain significant concentrations of lead and chlorides. By contrast, the two stage pH adjustment repeatedly produces a yellow solid precipitate, and analysis of this precipitate shows significantly higher concentrations of lead, but the chloride ion concentration is 50% or less than that obtained in the single stage pH adjustment.

TABLE 4

Comparison of Metal Precipitate Concentrations (ppm) by Colour

| Colour | Description | Cl | $SO_4$ | Ca | Cd | Cr | Cu | K | Na | Pb | Zn |
|---|---|---|---|---|---|---|---|---|---|---|---|
| yellow (1st trial) | 2 step pH adjustment | 50000 | 33500 | 34300 | 45.1 | 212 | 740 | 2640 | 3190 | 557000 | 95500 |
| yellow (2nd trial) | | 51000 | 10900 | 29100 | w | 400 | 1930 | 4880 | 4400 | 662000 | 23900 |
| yellow (3rd trial) | | 32200 | w | 13800 | w | 148 | 1510 | 3070 | 2500 | 753000 | 51500 |
| white | 1 step pH adjustment | 109000 | 12800 | 68700 | 25.6 | 113 | 1090 | 12500 | 8160 | 311000 | 46300 | w denotes concentrations below analytical detection limits

Figure 5:
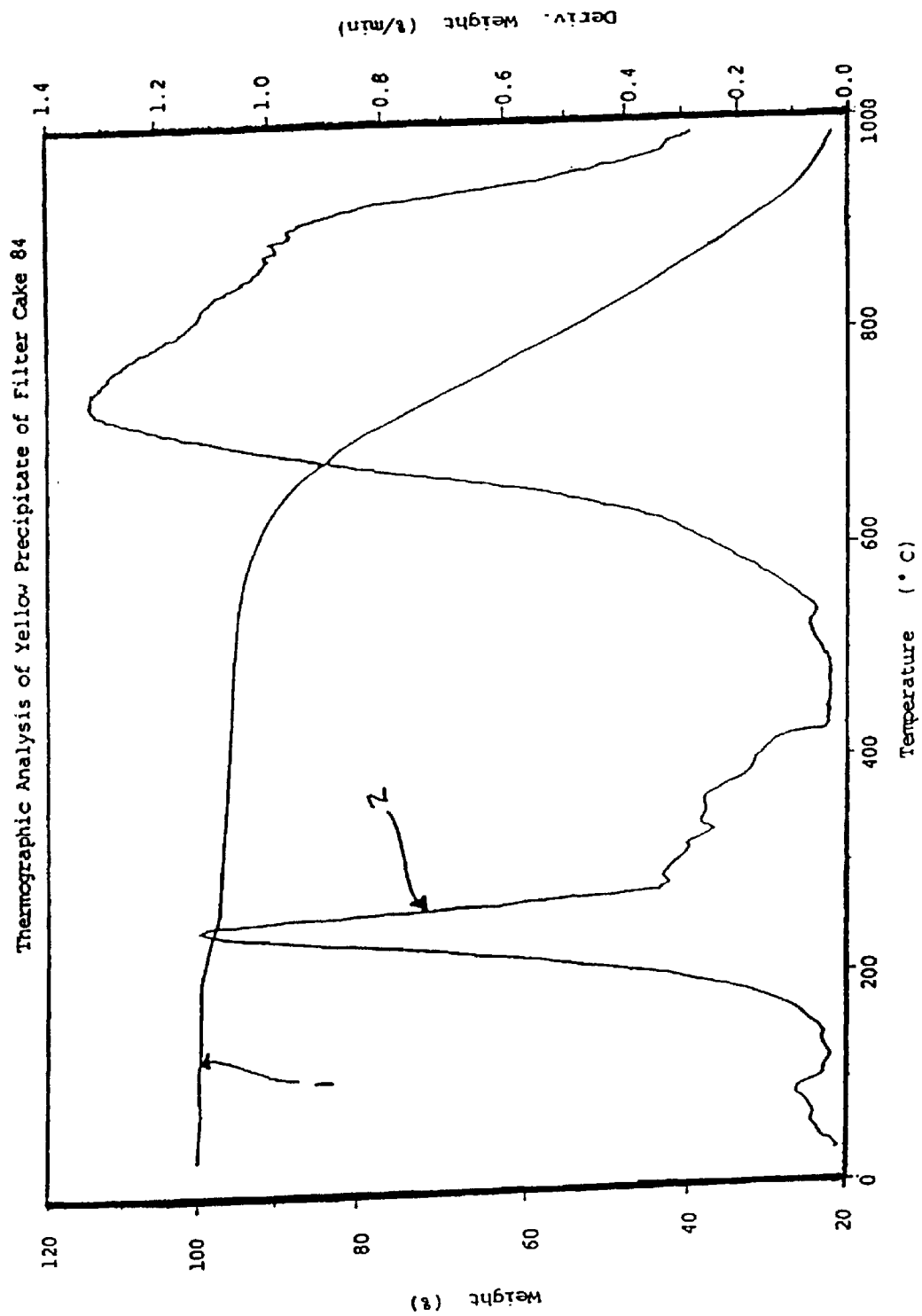
FIG. 5 is a thermographic analysis graph showing a plot of the weight percent of the yellow precipitate obtained during stage (2) against temperature.

A thermographic analysis has been conducted on the yellow precipitate, and the results thereof are illustrated in the graph shown in FIG. 5. A sample of the yellow precipitate was heated, the weight loss percent of the sample was plotted against temperature. The graph shows two lines. Line 1 is a curve showing the percent mass loss versus temperature. Line 2 depicts the derivative weight loss versus temperature, or, particularly, the temperature at which significant vaporization of compounds occurs. The first spike in Line 2 is at approximately 200–250° C. This spike corresponds to a slight dip in Line 1, and reflects driving off of the water of hydration. The second spike in Line 2 occurs at between approximately 700° C. and 800° C. The mass loss curve (Line 1) undergoes a large drop over this temperature range. The result corresponds closely to a loss of a significant quantity of precipitate at this range. The melting point for lead oxychloride ($PbCl_2.2PbO$) is over 693° C. The thermographic analysis indicates that lead oxychloride is a predominant compound present in the test samples of the yellow precipitate. Thus, it is believed that the species which is preferentially precipitated from the filtrate 46a during the two stage precipitation with HCl is lead oxychloride. This characterization of the precipitate as lead oxychloride is consistent with the colour change to yellow which is observed during the process of metal precipitation. The characterization is also consistent with the fact that a filtrate containing significant concentrations of calcium chloride (chloride ions) and low concentrations of lead is recovered after liquid/solid phase separation to remove the second lead enriched filter cake 84.

It will be appreciated that the present invention provides an efficient method for the treatment of APC fly ash/APC residues to remove and recover lead salts therefrom, so as to render the majority of the material classifiable as non-hazardous. Furthermore, the method results in the recovery of recyclable and potentially marketable lead smelter feed and calcium chloride liquor. It is to be understood that the above described examples are merely illustrative of the application of the principles of this invention. Those skilled in the art may readily devise other variations that will embody the principles of the invention. It is therefore to be understood that within the scope of the appended claims, the invention may be practised otherwise than as specifically described.

We claim:

1. A method for treating a fly ash/APC residue containing chlorides, sulphates, lead and metals selected from the group consisting of calcium, potassium, and sodium, said method comprising:

(a) washing and agitating the fly ash/APC residue with water using a water to fly ash/APC residue weight ratio value between 2.5:1 and 6:1 to form a residue slurry containing solubilized lead salts and calcium chloride;

(b) filtering the residue slurry to remove a filtrate having a pH value between 11.8 and 14.0 and containing the solubilized lead salts and calcium chloride; and (c) recovering a first calcium enriched filter cake;

wherein the steps (a) through (c) are conducted at ambient temperatures.

2. The method of claim 1, wherein the filtering step (b) is conducted using a screen filter press.

3. A method for removing and recovering lead salts from an aqueous liquid waste solution containing solubilized lead salts and calcium chloride, said waste solution obtained by washing fly ash, said method comprising:

(i) adding sufficient hydrochloric acid to the waste solution to lower the pH thereof to a value between about 10 and 11;

(ii) agitating the waste solution until a colour change from white to yellow occurs;

(iii) adding additional sufficient hydrochloric acid to the waste solution so agitated to lower the pH to a value between about 7 and 8;

(iv) filtering the waste solution to remove a brine containing calcium chloride; and, (v) recovering a yellow coloured lead enriched filter cake.

4. A method for treating a fly ash/APC residue containing chlorides, sulphates, lead and metals selected from the group consisting of calcium, potassium, and sodium, said method comprising:

(a) washing and agitating the fly ash/APC residue with water to form a residue slurry containing solubilized lead salts and calcium chloride;

(b) filtering the residue slurry to remove a filtrate having a pH value between 11.8 and 14.0 and containing the solubilized lead salts and calcium chloride; and (c) recoveing a calcium enriched filter cake;

(d) removing the solubilized lead salts from the filtrate by the sub-steps of:

(i) adding sufficient hydrochloric acid to the filtrate to lower the pH thereof to a value between about 10 and 11;

(ii) agitating the filtrate until a colour change from white to yellow occurs;

(iii) adding additional sufficient hydrochloric acid to the filtrate so agitated to lower the pH to a value between about 7.0 and 8.0;

(iv) filtering the filtrate to remove a brine containing calcium chloride; and (v) recovering a yellow coloured lead enriched filter cake.

5. The method of claim 4, wherein the filtering step (b) is conducted using a screen filter press.

6. The method of claim 4, comprising an additional sub-step (c)(i) of rinsing the calcium enriched filter cake with water, producing a rinse water.

7. The method of claim 6, wherein the water used in the sub-step (c)(i) to rinse the calcium enriched filter cake is recycled to wash the fly ash/APC residue in step (a).

8. The method of claim 4 further comprising concentrating and purifying the brine solution containg calcium chloride of step (d)(iv) to increase the calcium chloride concentration to a selected level and to remove contaminants therefrom by the steps of:

(e) heating the brine to cause evaporation of water from the calcium chloride brine;

(f) cooling the brine to cause selective precipitation of sodium chloride and potassium chloride contaminants from the calcium chloride brine; and, (g) recovering concentrated calcium chloride brine.

9. The method of claim 8, wherein the calcium chloride brine recovered in step (g) has a calcium chloride concentration of greater than 30% by weight.

10. The method of claim 9, wherein the water evaporated from the brine in heating step (e) is recycled to wash the fly ash/APC residue in step (a).

11. The method of claim 8, wherein steam generated by a waste incinerator is used as a heat source for the heating step (e) in the concentration and purification of calcium chloride brine.

12. The method of claim 8, wherein water evaporated from the calcium chloride brine in step (e) is recycled as a heat source to preheat said brine in the heating step (e).

13. The method of claim 8, wherein water evaporated from the calcium chloride brine in step (e) is recycled as a heat source to preheat a feed water stock in a steam generator.

14. The method of claim 4, wherein the agitating step (a) of the fly ash/APC residue and water has a duration between 2 and 10 minutes.

15. The method of claim 4, wherein the agitating step (d)(ii) of the filtrate has a duration between 5 and 10 minutes to obtain the colour change from white to yellow.

16. The method of claim 4, wherein the steps (a) through (d) are conducted at ambient temperatures.

17. The method of claim 4, wherein the hydrochloric acid of step (d)(i) has a concentration value between about 10N and 12N.

18. The method of claim 4, wherein the hydrochloric acid of step (d)(iii) has a concentration value of about 2N.

19. The method of claim 4, wherein the washing and agitating step (a) is conducted using a water to fly ash/APC residue weight ratio value between about 2.5:1 and 6:1.

20. The method of claim 4, wherein the calcium enriched filter cake has a leachable lead concentration value between 0.0 and 5.0 parts per million.

21. The method of claim 4, wherein the lead enriched filter cake has a lead concentration of greater than 50% by weight.

22. The method of claim 4, wherein the lead enriched filter cake contains lead precipitated as lead oxychloride.

23. The method of claim 4, wherein the step of recovering a lead enriched filter cake (c) is conducted using a filter press.

* * * * *